United States Patent [19]

Grobard

[11] 4,149,924
[45] Apr. 17, 1979

[54] FLEXIBLE HOSE MAKING MACHINE

[75] Inventor: Seymour Grobard, West Hartford, Conn.

[73] Assignee: Serv-Well Burner Corporation, Bloomfield, Conn.

[21] Appl. No.: 830,600

[22] Filed: Sep. 6, 1977

Related U.S. Application Data

[63] Continuation-in-part of Ser. No. 697,673, Jun. 18, 1976, abandoned.

[51] Int. Cl.² .................................................. B65H 81/04
[52] U.S. Cl. ...................................... 156/353; 83/369; 156/143; 156/388; 156/429
[58] Field of Search ............... 156/149, 189, 195, 429, 156/428, 425, 143, 353, 351, 459, 360, 387, 388, 430–432; 83/369, 363, 208; 118/7; 240/47.01, 47.07, 47.06, 47.08

[56] References Cited

U.S. PATENT DOCUMENTS

| 2,398,876 | 4/1946 | Bailey | 156/194 |
| 3,271,064 | 9/1966 | Hall | 156/143 |
| 3,524,371 | 8/1970 | Kröger | 83/369 |
| 3,890,181 | 6/1975 | Stent | 156/143 |
| 3,954,549 | 5/1976 | Carter | 156/486 |
| 4,012,272 | 3/1977 | Tiner | 156/429 |
| 4,029,006 | 6/1977 | Mercer | 118/7 |

Primary Examiner—Michael W. Ball
Attorney, Agent, or Firm—McCormick, Paulding & Huber

[57] ABSTRACT

A machine for winding continuous tape and wire to form a flexible endless duct, which duct is fed out of the winding station by a cluster of rolls, and which rolls also serve as a mandrel at the winding station. The rolls are cantilever mounted with circumaxially spaced individual roll axes arranged in a hexagonal pattern around a central duct forming axis. The axes of the rolls are adjustable radially toward and away from the central axis, and these roll axes are also collectively adjustable angularly, that is to skew their collective axes relative to the duct central axis. The duct is marked off in units of length by a device which is periodically operated through a revolution counting circuit, and the duct is also cut by devices operated from a branch of said counting circuit.

7 Claims, 9 Drawing Figures

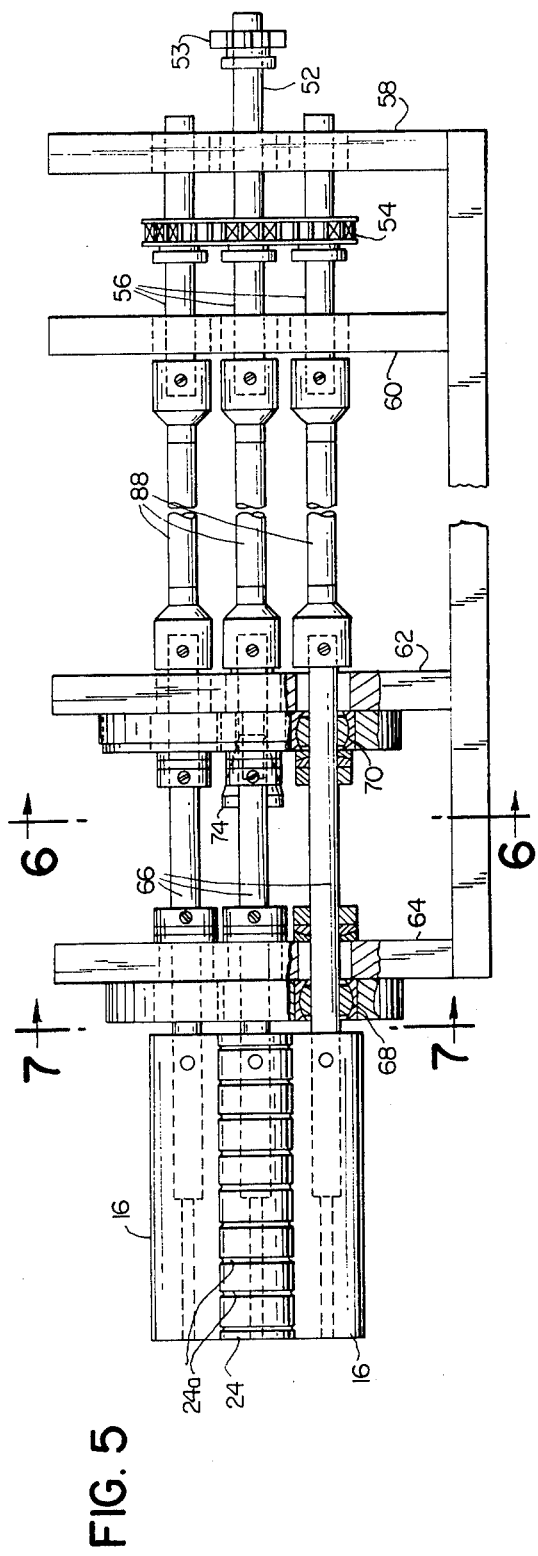
FIG. 5
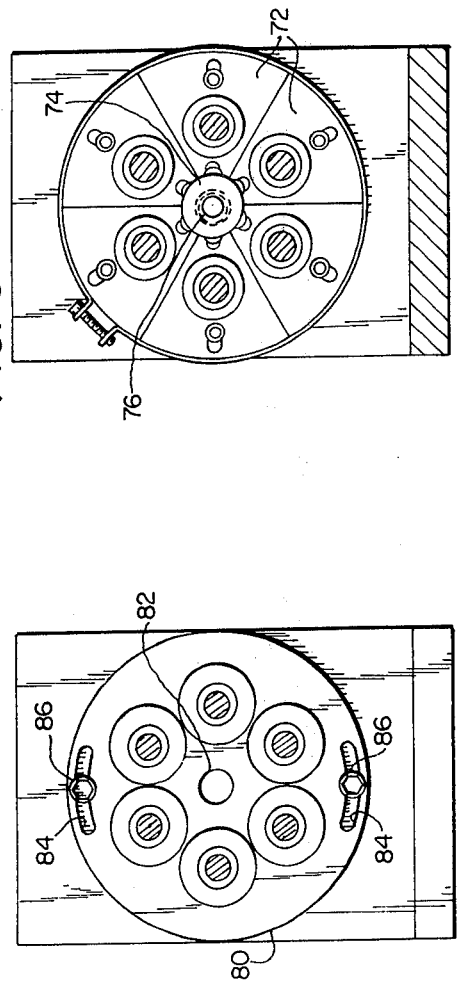
FIG. 6
FIG. 7

FLEXIBLE HOSE MAKING MACHINE

CROSS REFERENCE TO RELATED APPLICATION

This application is a continuation-in-part of Ser. No. 697,673 filed June 18, 1976, now abandoned.

SUMMARY OF INVENTION

This invention relates generally to machines for forming flexible ducts by helically winding a strip of flexible material together with a continuous length of wire so that the formed duct moves continuously in a forward axial direction off a mandrel or the like at the winding station of the machine. The machine disclosed herein is particularly adapted for efficiently producing simple, low cost flexible ducting such as is commonly used for installation between a vent and a household dryer or the like.

In its preferred form the machine includes a cluster of mandrel rolls at a winding station, the rolls being driven and one of their number being grooved to facilitate the forming of the duct in a continuously advancing mode. Means is provided for transporting the strip material to the winding station and also for transporting the wire thereto. The mandrel rolls are supported on associated shafts mounted in axially spaced front and rear sets of bearings. The fixed frame of the machine includes spaced bulkheads for supporting the front and rear sets of bearings, and these bearings can be moved relative to the central axis around which the duct is formed so that the individual mandrel rolls can be skewed relative to the central axis, and this skewing movement can be achieved while the radial spacing of the rolls with respect to the central axis is kept constant. The duct is continually formed at the winding stations so defined, and is continuously fed out of the winding station by reason of the slightly skewed mandrel rolls. The duct is marked off in units of length by a device which is periodically operated through a revolution counting circuit, and the duct is also cut by devices operated from a branch of said counting circuit.

BRIEF DESCRIPTION OF THE DRAWINGS

FIG. 5 is a sectional elevational view taken on the line 5—5 of FIG. 4 but to somewhat larger scale in order to better illustrate the means for supporting the various shafts associated with each of the individual mandrel rolls in the machine of FIGS. 1–4.

FIG. 6 is a sectional view taken generally on the line 6—6 of FIG. 5.

FIG. 7 is a sectional view taken generally on the line 7—7 of FIG. 5.

DETAILED DESCRIPTION OF FIGS. 1–7

Figures 1, 2:
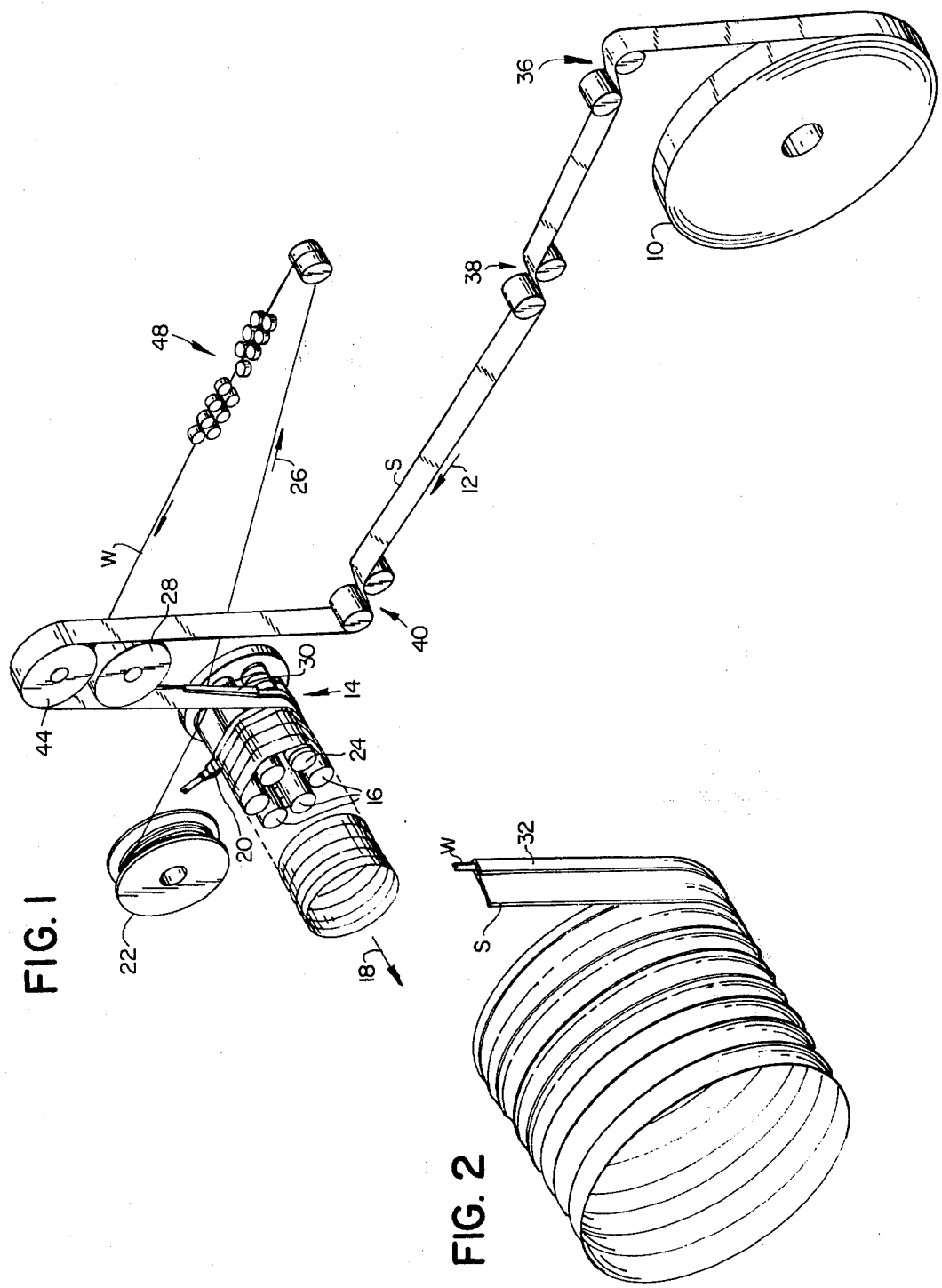
FIG. 1 is a perspective view illustrating in schematic fashion the means for transporting the strip material and the wire to the winding station, and also illustrates the duct being formed at such station.
FIG. 2 is a perspective view of the duct illustrating the precise manner in which the strip is joined to its reinforcing wire to form the completed flexible endless duct.

Turning now to the drawings in greater detail, and referring more particularly to FIG. 1, the machine of the present invention is particularly adapted to transport a strip S of plastic material such as polyvinyl chloride supplied from a roll, indicated generally at 10, generally in the direction of the arrow 12 to a winding station indicated generally at 14.

The winding station 14 comprises a plurality of circumaxially spaced mandrel rolls 16, 16 each of which rotates at a constant annular speed about its individual axis in order to draw the strip S from its supply roll 10 and wind the strip around the periphery of the cluster of rolls 16, 16. These rolls 16, 16 are designed to feed the wound strip forwardly in the direction of the arrow 18 such that the strip overlies itself with a pitch designed to be slightly less than the width of the strip in order to form the flexible duct. A solvent material is applied to the strip by a brush 20 which serves to weld the strip as it is so wound at the winding station.

A wire W is continuously fed from a supply reel 22, and in the embodiment shown the wire is first wound around the cluster or rolls, and then said wire is fed in the direction of the arrow 26, and around the roll 28 such that the wire is combined with a folded trailing portion of the strip S just prior to being wound around the mandrel rolls 16, 16. The rear edge of the strip S is folded forwardly by a fixed plow 30 such that the wire W is covered as indicated generally at 32 in FIG. 2. Preferably, one of the mandrel rolls 24 is provided with a series of axially spaced grooves best shown in FIG. 5 at 24a. These grooves, in conjunction with the slight skewing of the mandrel rolls, serve to positively feed the helically wound strip S in the forward direction, that is in the direction of the arrow 18 in order to continuously advance the formed duct out of the winding station.

While the strip S, and wire W are adapted to be combined at the winding station in order to form the duct of FIG. 2 in the manner described above it will be apparent from the description to follow that any convenient means might be used for combining the wire and strip at the winding station and that the present invention resides principally in the unique means for supporting the mandrel rolls such that these rolls can be collectively adjusted in order to vary the degree of skew of said rolls collectively with respect to a central reference axis, and also in order to make compensating adjustments in the radial spacing of the axes of these rolls at the winding station, particularly of the free ends of said mandrel rolls.

Figure 3:
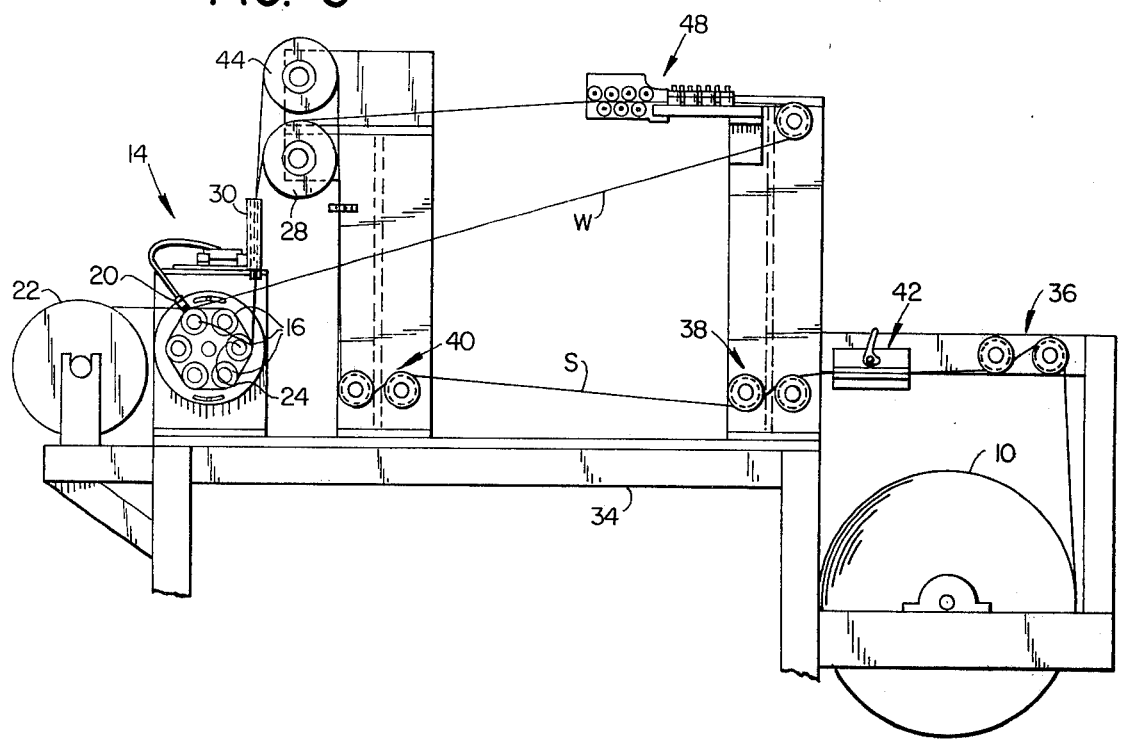
FIG. 3 is an end elevational view of the apparatus depicted schematically in FIG. 1.

FIG. 3 shows the overall machine as comprising a fixed frame 34 which includes fixed means for rotatably supporting the reel 10 of strip material S, said means including three pairs of over and under rolls 36, 38 and 40 and drag means 42 for exerting a predetermined snubbing force on the strip as it is transported to the winding station 14. In the superstructure of the fixed frame of the machine a roll 44 is provided around which the strip S passes before decending downwardly to engage the driven grooved roll 24 in the cluster. The mandrel rolls in the cluster are arranged in a hexagonal pattern so that their peripheries define a tangential circumscribed circle which will be the inside diameter of the duct of FIG. 2.

The wire W is stored on the reel 22, which may be supported in the fixed frame of the machine. The wire W passes around the cluster of mandrel rolls, so as to be drawn from the reel 22 and through a wire straightening series of rolls, indicated generally at 48, thence over the upper surface of a roll 28 also provided in the superstructure of the machine frame. Thus, the wire W and strip S are brought together at the folding device or plow 30 such that the strip S can be wrapped around the wire W as best shown in FIG. 2.

Conventional means is provided for making a solvent material available at the brush 20 in order to assure that the overlaid strips adhere to one another in the process of winding the strip on itself at the winding station.

Figure 4:
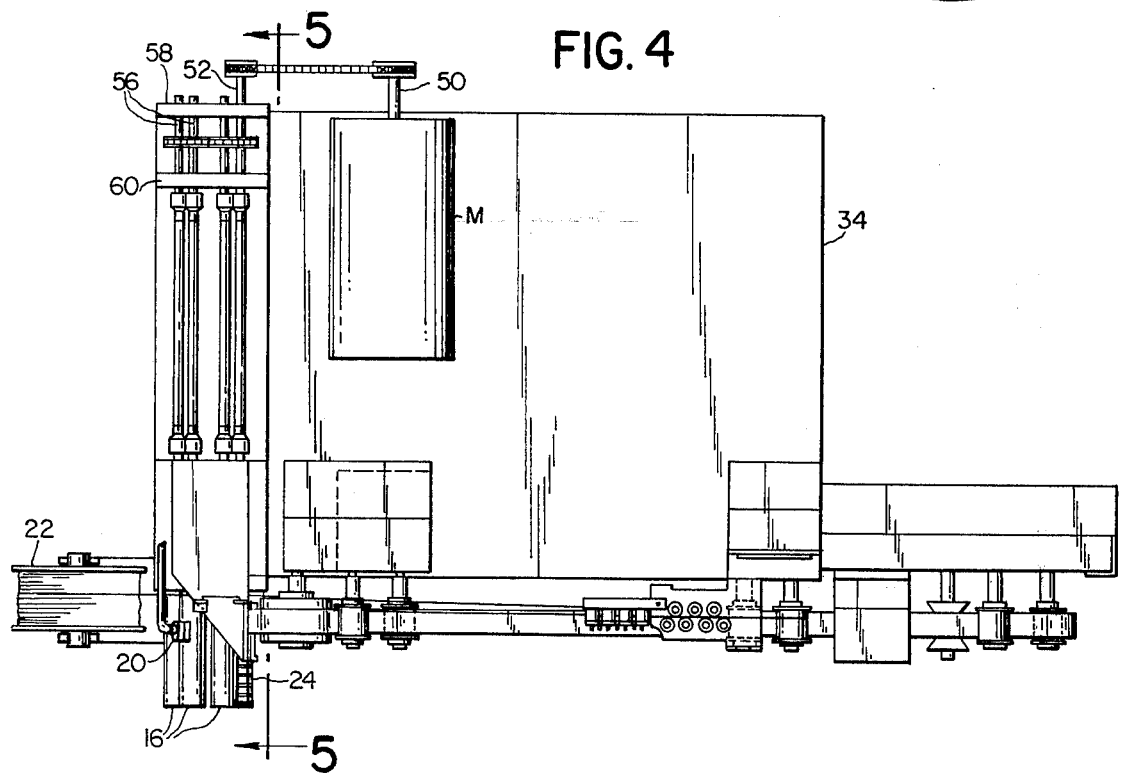
FIG. 4 is a plan view of the machine illustrated in FIG. 3.

FIG. 4 shows in plan view the machine frame 34 as comprising a generally rectangular bed upon which is mounted a motor M, which motor has an output shaft 50 and sprocket adapted to drive a chain and a second sprocket on the shaft 52 associated with the grooved mandrel roll 24. Actually, and as best shown in FIG. 5 all of the mandrel rolls are driven, being ganged for rotation in the same direction and at the same peripheral speed by a chain 54, entrained over sprockets associated with each of the shafts 56, 56.

A series of bulkheads 58, 60, 62, and 64, best shown in FIG. 5, are provided in the fixed frame of the machine in order to rotatably support the shaft means associated with the mandrel rolls. The shaft 52 is adapted to be driven by the chain 53 from the output shaft 50 of the motor M and FIG. 5 is taken generally on the line 5—5 of FIG. 4 comprising a sectional elevational view revealing in detail the means for rotatably and adjustably supporting the various shaft means associated with the mandrel rolls. Each of the mandrel rolls 16, 16 and the grooved roll 24 has a rearwardly extending support shaft 66 associated therewith in order to rotatably support the rolls cantilever fashion at the winding station. Axially spaced front and rear sets of bearing means are provided for the shafts 66, 66 and these bearing means comprise a plurality of spherical bearings, two of which spaced bearings are illustrated at 68 and 70 in FIG. 5, being the spherical bearings associated with the front and rear bulkheads 64 and 62 respectively. Individual adjustable support means are provided for each of the sets of front and rear bearings so that the support shafts associated with the mandrel rolls can be moved by providing for movement of the support means.

Referring to FIGS. 6 and 7, it will be apparent that the spherical bearings 70, 70 at the rear bulkhead 62 are each supported in individual quadrants or plates 72, 72, one of which plates is associated with each of the support shafts 66 associated with each mandrel roll 16. These individual quadrant plates are adjustable radially with respect to the central axis defined at the center of the hexagonal pattern of mandrel shafts 66, 66 and all of these plates 72, 72 can be maintained in a predetermined radial position with respect to such central axis by means of a tapered plug 74 slidably mounted for axial movement on the central axis by means of a central post 76 provided for this purpose in the bulkhead 62. Thus, axial movement of the plug 74 on its associated post of shaft 76 will cause equal radial movement of all of the plates 72, 72 and correspondingly radial movement of all of the spherical bearings 70, 70 associated with the inner or rear ends of the support shafts 66, 66. Enlarged openings are provided in the bulkhead 62 for these shafts to allow for this radial movement.

The above described radial movement of the inner, or rear end portions of the shafts 66, 66 is provided for in order to maintain all of the mandrel rolls 16, 16 in a desired radial position, particularly of the free end portions thereof. Because of the fact that the skew angle of each of these shafts are adjusted in a manner to be described, this radial adjustment of the mandrel support shaft is necessary.

The forward bulkhead 64 also includes enlarged openings for the forward ends of the shafts 66, 66 and a circular plate 80 is mounted to the bulkhead 64 by means of a central pivot post 82 provided for this purpose, and best shown in FIG. 7. Arcuate slots 84, 84 are provided in the plate 80 so that projecting bolts 86, 86 in the bulkhead limit the degree of angular rotation for the plate 80 with respect to the bulkhead, also on the central axis defined by the hexagonal orientation of the mandrel roll support shafts 66, 66. Thus, limited rotation movement of the plate 80 will achieve a desired degree of skew for the individual mandrel rolls in a collective fashion. As a result of so skewing these rolls it will be apparent that the circle defined by the free end portions of the cantilevered mandrel rolls will increase or decrease. In order to avoid changing the diameter of this circle the above described means for adjusting the radial position of the inner ends of the shafts 66, 66 will be seen to permit the diameter of this circle to be kept at a desired size.

Finally, the means for rotating the shafts 66, 66, in spite of the adjustments described above, is provided for by the flexible shafts 88, 88 which connect the shafts 56, 56 with the adjustable shafts 66, 66 upon which the mandrel rolls are mounted.

DETAILED DESCRIPTION OF FIGS. 8 AND 9

Figure 8:
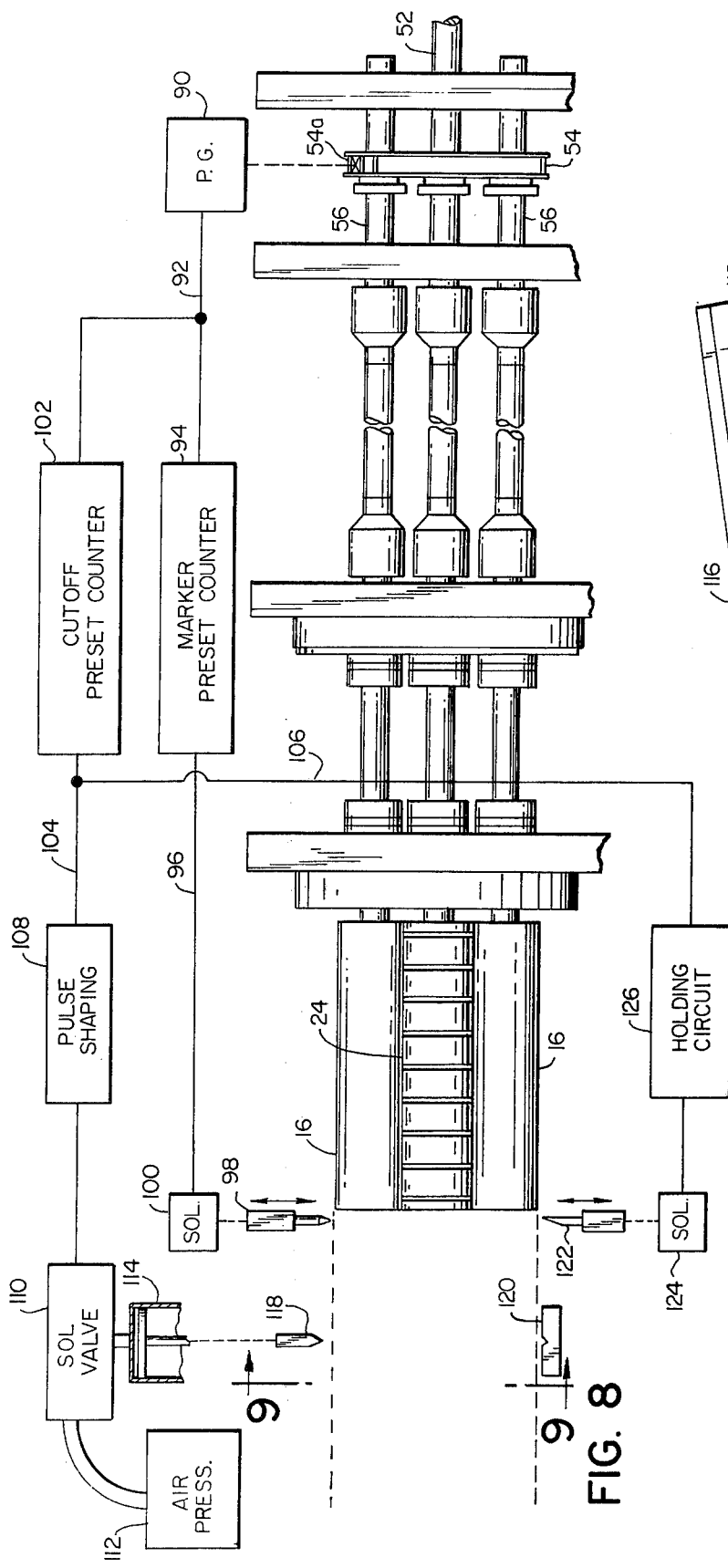
FIG. 8 is a schematic view similar to FIG. 5 but also showing revolution counting circuitry, and marking and cut off devices operated thereby pursuant to an alternative embodiment of the apparatus depicted in FIGS. 1–7.

The apparatus described above with reference to FIGS. 1–7 has been reproduced in the schematic of FIG. 8 to illustrate that this alternative embodiment incorporates the structure of the previous embodiment, but includes certain refinements to be described.

Once the apparatus of FIGS. 1–7 has been set up, and is operating to produce the flexible duct of FIG. 2, the machine operator must monitor the product so that segments can be prepared for packaging or the like. A V-shaped trough (not shown) may be provided downstream of the winding station to support a length of duct thereon, and the operator may periodically sever this duct, and remove segments from such trough to make room for the duct being continually formed and fed from the winding station. The refinements of FIG. 8 represent improvements devised for automating these responsibilities of the operator, and for marking off the duct product at predetermined intervals to improve its usefulness to the end user.

Drive shaft 52, associated with the grooved mandrel roll 24, also rotates the other shafts 56, 56 by reason of the chain 54 entrained over sprockets associated with all of these shafts as described above. Means is provided for producing an electric pulse related in frequency to the speed of revolution of the product at the winding station, and as shown said means may comprise a magnetized link 54a in this chain 54, so arranged with respect to a sensing device 90 as to generate an electric pulse in the conductor 92 in response to each complete revolution of the chain 54.

This timing pulse is fed to a preset counter 94 such that a signal or marker pulse is generated in conductor 96 after a predetermined number of revolution pulses have been counted. Since the pitch of the duct is known, having been determined by the set-up procedure outlined above, the time period of this marker pulse in line 96 can be related to the desired increment of length for the duct which is to be marked by pen 98 operated by solenoid 100. The pen 98 could also comprise an ink filled nozzle which could communicate with a source of ink through a solenoid controlled valve (not shown). In any event, the result is to mark the duct as it is fed from the winding station so that convenient increment marks (usually in feet) are provided thereon to facilitate use of the product by the customer.

The revolution pulses in conductor 92 are also fed to a cut off counter 102, which is also capable of being preset to provide an output in lines 104 and 106 in response to some predetermined input pulse count. For example, if the apparatus is to be programmed to produce ducts of 7 feet in length one would preset counter 102 with an appropriate pulse count (dictated by the pitch of the tape and the number of revolutions required to equal 7 feet).

Figure 9:
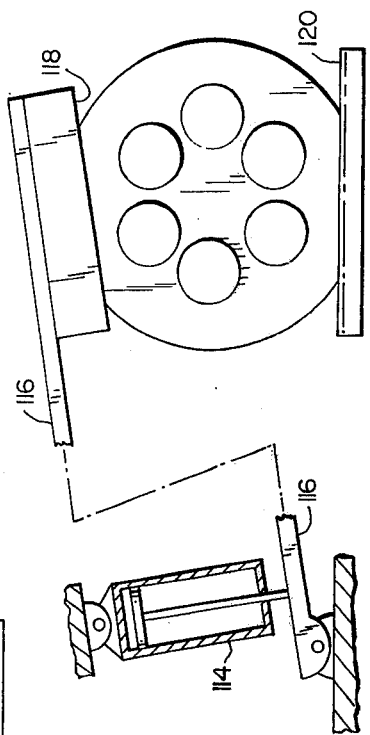
FIG. 9 is a sectional view taken generally on the line 9—9 of FIG. 8.

The cut off signal so produced in line 104 is preferably amplified by the pulse shaping circuitry 108 to control solenoid valve 110. Air under pressure from source 112 is thereby made available through this valve 110 to operate air actuator 114. The movable portion of actuator 114 is connected to a lever, 116 in FIG. 9, so that cut off blade 118 acting against anvil 120 cuts the wire W used in making the duct. The tape S is not conveniently cut by the blade 118, because said blade is designed to cut steel wire rather than plastic tape. Therefore, a plastic tape cutting knife 122 is provided on the movable part of a solenoid 124 for slitting the plastic tape portion of the flexible duct between the convolutions of wire. The knife 122 is located between the ends of the mandrel rolls 16, 16 and the wire cutting blade 118 so that the latter need only sever the wire, the plastic tape sidewall of the duct being slit by the knife 122 upstream of the anvil 120.

The control of solenoid 124, for operating the plastic tape slitting knife 122, is provided from the output of preset cut off counter 102 in the conductor 106. Thus the knife 122 operates simultaneously with the action of lever mounted blade 118. However, the knife 122 must be held in slitting position for at least one complete revolution of the duct being fed from the winding station, and therefor, a holding circuit 126 is provided for solenoid 124 to maintain knife 122 in its extended position for this slitting operation.

I claim:

1. A machine for forming flexible duct by helically winding a strip of flexible material with a continuous length of wire so that the formed duct moves continuously in a forward axial direction, said machine comprising:
   mandrel means at a winding station and including a cluster of circumaxially spaced rolls arranged in spaced radial relationship to a duct axis fixed in the machine frame,
   strip transporting means for advancing the strip material to the winding station,
   wire transporting means for advancing the wire to the winding station,
   a plurality of shafts, each of which supports one of said mandrel rolls and has a rearwardly extending portion such that said rolls are cantilevered and supported for rotation on individual roll axes,
   drive means for said rolls including ganged shaft means for rotating all of said rolls in the same direction and at the same speed, said drive means further including flexible coupling means between said mandrel roll shafts and said ganged shaft means,
   axially spaced front and rear bearing means for supporting said mandrel roll shafts,
   front frame means including a plate for supporting said front bearing means for limited angular movement about said duct axis while restraining said front bearing means to remain in fixed radial relationship to said central duct axis to collectively skew said rolls with respect to said central duct axis,
   rear frame means for supporting said rear bearing means for limited radial movement toward and away from said duct axis to provide a desired duct diameter defined by the peripheries of said mandrel rolls at said winding station, said rear frame means including a conical plug at said duct axis and radially slidable elements movable radially in response to axial movement of said plug to achieve said desired duct diameter.

2. The machine defined by claim 1 wherein said plate for supporting said front bearing means is rotatably mounted in a fixed part of said front frame means for limited angular adjustment on said duct axis.

3. The machine defined by claim 1 wherein said wire is wound around said cluster of rolls to advance the wire to said winding station.

4. The machine defined by claim 1 further characterized by electrical means for producing pulses proportionate in frequency to the speed of rotation of said mandrel rolls, means for counting said pulses and providing an output signal responsive to a preset count, and duct cut off means adjacent said winding station and responsive to said output signal for cutting said duct into segments of predetermined length related to said preset count.

5. The machine defined by claim 1 further characterized by electrical means for producing pulses proportionate in frequency to the speed of rotation of said mandrel rolls, means for counting said pulses and providing an output signal responsive to a preset count, and duct marking means adjacent said winding station and responsive to said output signal for marking said duct at unitary length intervals for convenience in subsequent packaging and installation.

6. The machine defined by claim 4 wherein said duct cut off means includes a wire cut off blade and a strip slitting knife both of which operate in response to said preset cut off counting means output signal, and means for holding said knife in its slitting position for at least one complete revolution of said duct on said mandrel rolls.

7. The machine defined by claim 6 further characterized by second presettable counting means in electrical parallel with said first mentioned counting means, and duct marking means responsive to the output from said second counting means for marking off the continuously formed duct in incremental units of length.

* * * * *